United States Patent [19]
Dickenson

[11] 3,848,621
[45] Nov. 19, 1974

[54] DOUBLE BLOCK AND BLEED GATE VALVE TO CONTROL UNIDIRECTIONAL METER PROOVER SPHERE

[75] Inventor: Harvard G. Dickenson, Tulsa, Okla.

[73] Assignee: Valve Specialty Supply, Inc., Tulsa, Okla.

[22] Filed: Dec. 17, 1973

[21] Appl. No.: 425,230

[52] U.S. Cl. ............... 137/268, 15/104.06 A, 73/3
[51] Int. Cl. ............................................. G01f 25/00
[58] Field of Search ............. 137/268, 15, 119, 168, 137/625.48; 15/104.06; 251/197, 199, 204, 327, 328, 157; 73/3, 195; 243/19; 124/11; 302/49

[56] References Cited
UNITED STATES PATENTS

| | | | |
|---|---|---|---|
| 3,063,079 | 11/1962 | Bergman et al. | 137/268 X |
| 3,125,323 | 3/1964 | Heinen | 251/197 |
| 3,146,477 | 9/1964 | Bergman et al. | 137/268 X |
| 3,220,432 | 11/1965 | Allen | 137/268 |
| 3,638,475 | 2/1972 | Grove | 73/3 |
| 3,668,923 | 6/1972 | Grove | 73/3 |
| 3,743,244 | 7/1973 | Dickenson et al. | 251/197 |

Primary Examiner—William R. Cline
Assistant Examiner—Robert J. Miller
Attorney, Agent, or Firm—Head & Johnson

[57] ABSTRACT

This Abstract describes an improved sphere launcher for a meter prover system, which includes improved means for sealing the bypass between the input and the output of the prover. It comprises an elongated chamber, preferably maintained in a horizontal position, in which there is a sphere catcher which can be moved horizontally from an inlet position where there are two inlets, to an outlet position where there is a single outlet. In the outlet position, means are provided for sealing the inlets to the chamber. The sealing means comprises two portions which have surfaces adapted to be pressed outwardly against seal rings circling the two inlet openings to the chamber. These two portions are constructed to cooperate with a wedge shaped intermediate portion, so that when they are properly seated in position opposite the two inlet openings, further movement of the wedge causes them to be pressed outwardly and thereby to compress sealing rings so as to adequately seal the openings.

8 Claims, 2 Drawing Figures

PATENTED NOV 19 1974 3,848,621

DOUBLE BLOCK AND BLEED GATE VALVE TO CONTROL UNIDIRECTIONAL METER PROOVER SPHERE

CROSS REFERENCES TO RELATED PATENT

This invention is related to U.S. Pat. No. 3,743,244 granted to the same inventors, issued July 3, 1973, and entitled "Top and Bottom Gate Valve for Removing and Replacing Removable Seating Elements."

BACKGROUND OF THE INVENTION

This invention lies in the field of sphere launchers for meter provers. More particularly, it involves means for introducing and removing a sphere into and from the prover system. Still more particularly, it involves an improved method of sealing the bypass connection between the input and the output of the meter prover loop, whereby a sphere which has passed through the loop can be introduced into an inlet to the launcher chamber, and moved to a corresponding outlet opening of the launcher, so as to be re-entered into the prover loop. The principle feature of this launcher is that it provides for improved pressure seal means and for removing and replacing removable sealing and seating elements.

In the prior art, sphere launchers have generally provided sealing means using a compliant sphere which is of slightly larger diameter than the bypass pipe so that as the sphere is pushed through the bypass pipe it adequately seals fluid pressure between the inlet and the outlet of the prover loop.

In the prior art if there is not adequate sealing, there is no way of correcting or adjusting the sealing means so as to improve the effective seal.

SUMMARY OF THE INVENTION

It is a primary object of this invention to provide a sphere launcher in which the sealing means in the bypass between the inlet and the outlet of the prover loop, can provide as tight a seal as desired. It is a further object of this invention to provide a sealing means which can be easily removed and replaced when it becomes worn. It is a still further object of this invention to provide means for indicating when a seal is not operative.

These and other objects are realized and the limitations of the prior art are overcome in this invention by providing a sphere launcher which comprises an elongated chamber generally disposed in a horizontal position. There is one inlet on the top surface, for the return of spheres from the prover loop. Another inlet on the bottom surface is for introducing a sphere into the system. A single outlet opening on the bottom surface is provided, through which the sphere is launched into the input of the loop. The inputs are displaced horizontally from the output and means are provided for carrying a sphere horizontally from the inlet position to the outlet position, by screw means, to laterally traverse a sphere catcher and move the sphere from one position to the other. When the sphere catcher is in the outlet position, that is, opposite the outlet pipe, a sealing means is provided across the two inlet openings, so as to completely seal the outlet from the inlets, and provide a sealed bypass across the prover loop. The sealing means comprises two portions which are constructed with wedge surfaces, so that when a wedge is placed between them having the same wedge angle, they can be displaced transversely and forced outwardly from each other (that is, one up, and the other down) so as to press sealing surfaces tightly against sealing rings.

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
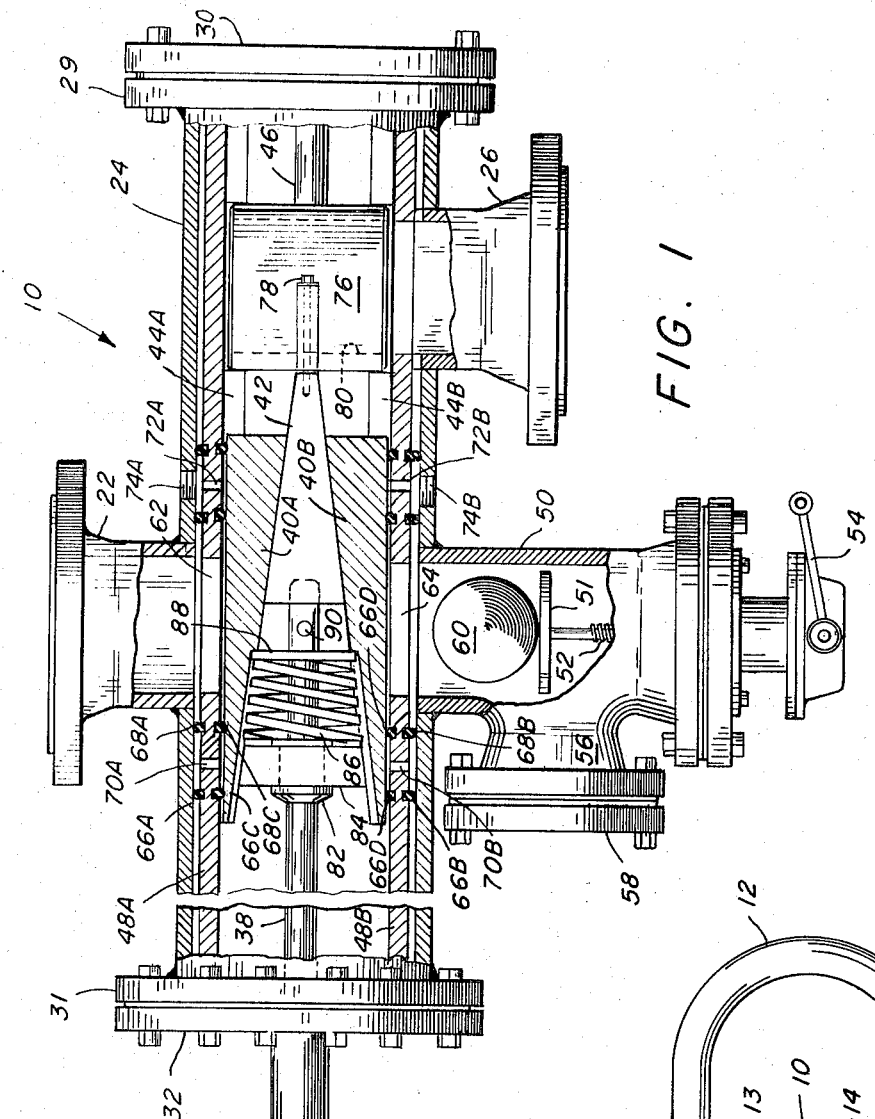
FIG. 1 represents in vertical cross section the improved sphere launcher of this invention.

Referring now to the drawings and in particular to FIG. 1 there is shown in vertical cross section a preferred embodiment of this invention. The sphere launcher is indicated generally by the numeral 10. It comprises an elongated chamber 24 which may be made in a circular or in a rectangular cross section, the rectangular cross section being preferred. There are two end flanges 29 and 31 which are welded to the rectangular chamber 24. These flanges 29 and 31 are covered and sealed by cover plates 30 and 32, respectively. Means 34 are provided on cover plate 23 for the passage and sealing of a shaft, or rod, 38 which is attached at its end to a screw means 36 which in conjunction with a hand wheel 28 is adapted to traverse the rod 38, and with it the sealing means 40A, 40B and 42.

Inside of the chamber 24 is a liner or insert, which is removable, against which the sealing means is operated. The insert shown as 48A and 48B comprises a rectangular tubular section which is inserted into the chamber 24 and is sealed to the chamber 24 by seal rings 66A and 68A on one side and corresponding seal ring 66B and 68B on the opposite side. There are two openings 62 and 64 in opposite faces 48A and 48B, respectively, of the insert, corresponding to the openings in the upwardly leading pipe 22 and the downwardly leading pipe 50 for the introduction of spheres into the sphere launcher. The walls 48A, 48B can be part of a rectangular tube, or simply two plates in suitable guides.

Figure 2:
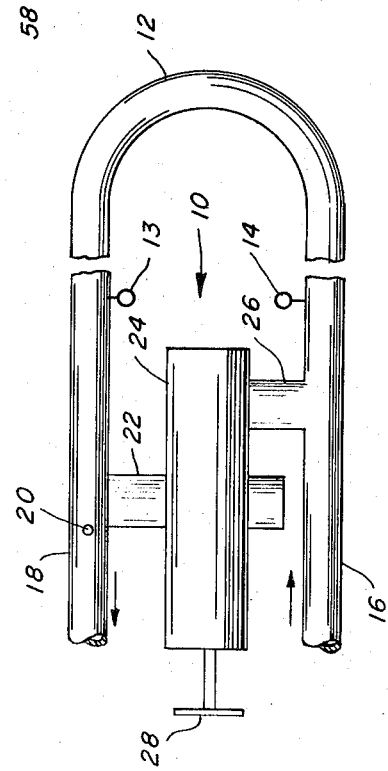
FIG. 2 represents a complete meter prover loop and launcher system illustrating how this launcher is inserted into a prover system.

As shown in FIG. 2 the meter prover system comprises an inlet pipe 16 in which liquid is introduced into the prover loop, which comprises the portion 12, and includes two sphere detectors 14 and 13. The time of passage of the sphere is determined from the signals received from the detector 14 and 13, as the sphere passes them in going through the loop 12. The liquid passing into the loop through inlet pipe 16 goes through the loop 12 and back out through pipe 18. A sphere is introduced into the loop by being passed down through vertical pipe 26 from the launcher 10. It is then picked up by the moving stream of liquid, past the detector 14 and through the prover loop 12, past the detector 13 and then out along pipe 18 until it comes to a stop rod 20 which prevents it from passing down the pipe 18, and causes it to drop down into pipe 22, which is the return inlet for the launcher 10. From that position in pipe 22 it is carried horizontally over to the position of pipe 26, where it can be reinserted into the prover loop, and so on.

A sphere returning from the loop will be introduced into the launcher through pipe 22 where it will rest on top of the surface of seal member 40A. Seal members 40A, 40B are wedge-shaped pieces between which are inserted a wedge 42. The angles of wedging are such that the two upper and lower faces of the portions 40A and 40B are plane and parallel to each other. On the inner faces of the insert or liner, 48A, 48B are two additional sealing rings 66C and 68C and 66D and 68D.

It will be clear to one skilled in the art that when the sphere is in the loop 12 that the bypass connection between pipe 22 and pipe 26 must be positively closed, so that all the liquid entering pipe 16 will be passed through the loop and out through the pipe 18. This sealing is effected by the seal rings 66A, 68A and 66B and 68B between the insert and the chamber 24, and also by the seal rings 66C and 68C, and 66D and 68D facing against the top and bottom surfaces of the wedge portions 40A and 40B. The wedge portions 40A and 40B are guided by a transverse bar 84 which has an opening through which the rod 38 passes. The wedge portions 40A and 40B are pressed to the right by the collar 82 on the rod 38, so that as the rod 38 moves to the right, it causes the wedge portions 40A and 40B to move to the right, until they are seated against the stop rods 44A and 44B, at which time the wedge portions are centered around the openings 62 and 64. Further motion of the rod 38 to the right causes the spring 86 to be compressed as the shoulder 82 presses on the bar 84, compressing the spring 86 and forcing the end ring 88, which presses on the wedge portions, to hold them tightly against the stops 44A and 44B.

The central wedge portion 42 is attached to the end of the rod 38. As the rod 38 moves farther to the right the central wedge portion 42 presses outwardly on the two wedge portions 40A and 40B and causes them to seat more tightly against the seal rings 66C, 68C, 66D and 68D. Thus, as tight a seal as desired can be effected between the wedge portions 40A and 40B against the inserts 48A and 48B which are themselves sealed to the chamber 24.

Attached to the central wedge portion 42 is a tubular portion or ball catcher 76 which has an internal diameter 80 which is slightly larger than the sphere 60. When the rod 38 is moved to the left by means of the hand wheel 28 and screw 36 it pulls the wedge 42 back, releasing the outward pressure on the two wedge portions 40A and 40B, so that they can move inwardly, but they are still held against the stops 44A and 44B by the spring 86. However, as the rod 38 moves farther to the left, a pin 90 presses on the ring 88 and causes the bar 84 to move to the left, and with it the wedge portions 40A and 40B. Thus, the entire assembly including rod 38, wedge 42, wedge portions 40A and 40B and sphere catcher 76, which is fastened to the wedge 42 by means of bolts 78. All of this assembly moves to the left until the axis of the opening 80 in the sphere catcher 76 is lined up with the openings 62 and 64 of the top and bottom inlets.

The top inlet 22 is for the return of a sphere from the loop. The bottom inlet 50 is for the introduction or removal of a sphere from the system. In the pipe 50 is a circular table 51 mounted on a screw 52 which by means of the crank 54 and gearing (not shown but well known in the art) can cause screw 52 to lift the table. When the table is in its bottom position the cover plate 58 can be removed and a sphere 60 inserted through the opening onto the table in the position shown, then the cover plate 56 is resealed in position, and by means of the crank 54 the table 51 is raised. When the sphere catcher 76 is moved to the left, so that it is above the opening 64, the sphere can then be raised to the point where it fits inside of the catcher 76. Then by moving the rod 38 to the right the sphere can be traversed until it is over the opening 26 through which it can be launched into the prover loop.

Conversely, if, after the sphere has passed through the prover loop and is returned into the pipe 22 and is resting on top of the wedge portion 40A, the table 51 can be lowered to its bottom position and when the sphere catcher 76 is moved to the left until it lines up with the opening 62, the sphere now in the pipe 22 will fall through the catcher 76, through the opening 64 into the pipe 50 and will rest on top of the table 51 from which it can be removed through the opening 56.

The apparatus described in connection with FIG. 1 provides a means for inserting a sphere 60 into the system for initiating and/or launching a sphere into the meter prover loop and for receiving a sphere after it has passed through the loop and for relaunching that sphere, or removing it from the system, as may be desired. However, an important feature of the invention lies in the improved sealing system by means of which the openings 62 and 64 are perfectly sealed by means of the wedge portions 40A and 40B, which in operation are slid laterally into position and then forced apart by wedge 42 so as to perfectly seal against the seal rings positioned in the insert means 48A and 48B.

The use of two seal rings in each of the sealing surfaces such as 66A, 68A, 66B and 68B and 66C and 68C and 66D and 68D provide an opportunity for detecting whether there is a leak in the sealing system. For example, in operation, the space inside the pipe 22 is under high pressure corresponding to the liquid in the pipeline 16 and 18. The space surrounding the insert 48A, 48B inside of the chamber wall 24 is a continuous space, and is under pressure. Similarly, the space inside of the insert, that is between the insert walls 48A, 48B and the sealing wedges 40A and 40B is also under high pressure from the pipe system, through the pipe 26. There are a series of openings 70A, 72A, 70B and 72B which connect opposite faces of the inserts together, so that the space between the two concentric sealing rings on the four faces are tied together.

These openings and the space between the seal rings are exposed to a threaded opening 74A or 74B. Thus, by placing a valve in the opening 74A and a pressure gauge on the outside of the valve it can be determined that the pressure is in these annular spaces. The annular space is first connected by means of the valve to atmospheric pressure, and then connected to the pressure gauge. Any increase in pressure on the gauge will be evidence of fluid leaking into the annular space from the pipeline system, and would indicate unsatisfactory sealing between the sealing wedges 40A and 40B and the inserts 48A and 48B. On the other hand, if the pressure stays constant at the low atmospheric value it would be evidence of adequate sealing between the inlet pipe 22 and the outlet pipe 26 across the inlet and output of the prover loop 12.

It will be clear also that means, as are well known, can be placed in pipe 26 to releasably hold the sphere after it is dropped into pipe 26 and before it is dropped into pipe 16.

In review, the meter prover sphere launcher of this invention provides five distinct advantages. One, it provides a means for taking a sphere from its return position to its launch position. Two, in the launch position it provides a satisfactory seal between the inlet and outlet connection. Three, in moving between the launch position and the inlet position, the sealing surfaces are relaxed and withdrawn from the seal rings, so that there is a minimum of wear on the seal rings. Four, means are provided for indicating the efficiency of the seal system. Five, the sealing rings are mounted in a removable insert or linear, which can be quickly removed and replaced with renewed seating elements.

The drawings show insert means 48A and 48B, with seal rings 66A, 68A and 66B, 68B to seal the inserts to the walls of the chamber 24. However, these are provided so as to have opportunity to rapidly remove and replace the seal rings as they become worn. It will be clear that this invention can be utilized without the inserts 48A, 48B and with seal rings in the top and bottom surfaces of wedge shaped portions 40A, 48B, and with seal rings in the top and bottom surfaces of wedge shaped portions 40A, 48B, bearing directly on the inside surfaces of the top and bottom walls of the chamber 24.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. A sphere launcher for a meter prover system comprising:
   a. a horizontal chamber having at least one inlet opening on its upper surface, and at least one outlet opening on its lower surface, displaced horizontally from each other;
   b. means connecting said outlet opening to the inlet pipe of a meter prover loop, placed below said outlet, and means connecting the outlet pipe of said prover loop, above said chamber inlet, to said inlet;
   c. seal means and sphere catcher means inside said chamber, arranged so that when said sphere catcher means is aligned with said outlet, said seal means is sealing said inlet, and means to move said seal means and sphere catcher means so that said sphere catcher means is aligned sequentially with said inlet and said outlet; and wherein
   d. said seal means including wedge means to force sealing surfaces outwardly in contact with sealing rings to seal said inlet from said outlet.

2. The sphere launcher as in claim 1 including removable liner means inserted between said seal means and said chamber walls, said liner means including compliant seal means whereby said liner means is sealed to said chamber wall and to said seal means.

3. The sphere launcher as in claim 1 including second inlet means on the lower wall of said chamber displaced from said outlet, said second inlet for the purpose of inserting spheres into said launcher.

4. The sphere launcher as in claim 3 in which said first and second inlets are aligned vertically.

5. The sphere launcher as in claim 1 in which said seal means comprises:
   a. at least one wedge-shaped member having a top sealng surface;
   b. a wedge portion cooperating with said wedge-shaped member;
   c. operating rod means attached to said wedge portion;
   d. spring means between said rod means and said wedge-shaped member; and
   e. stop means attached to said chamber to limit the lateral movement of said wedge-shaped member.

6. The sphere launcher as in claim 5 in which said sphere catcher means is attached to said wedge portion.

7. A sphere launcher for a meter prover system comprising:
   a. a horizontal chamber having two inlet openings, one on its upper surface and one on its lower surface and at least one outlet opening on its lower surface displaced horizontally from said inlets;
   b. means connecting said outlet opening to the inlet pipe of a meter prover loop placed below said outlet, and means connecting the outlet pipe of said meter prover loop above said chamber inlet, to said inlet;
   c. seal means and sphere catcher means inside said chamber arranged so that when said sphere catcher means is aligned with said outlet, said seal means is in position to seal said inlet openings, and means to move said seal means and sphere catcher means so that said sphere catcher means is aligned sequentially with said inlets and said outlet;
   d. removable insert means inside of said housing and means to seal said insert means to the inside surfaces of said housing;
   e. said seal means and sphere catcher means comprising a pair of wedge shaped elements having a top sealing surface on the upper element and a bottom sealing surface on the lower element, a central wedge portion cooperating with both of said elements, operating rod means attached to said wedge portion, spring means cooperating between said rod means and said wedge shaped elements, stop means attached to said chamber to limit the lateral movement of said wedge shaped elements, said sphere launcher attached to said central wedge portion.

8. The sphere launcher as in claim 7 and including in said second lower inlet, means to introduce a sphere into said launcher.

* * * * *